Figure 6:
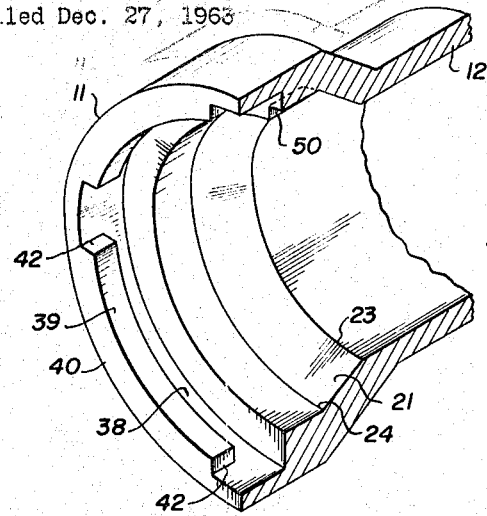

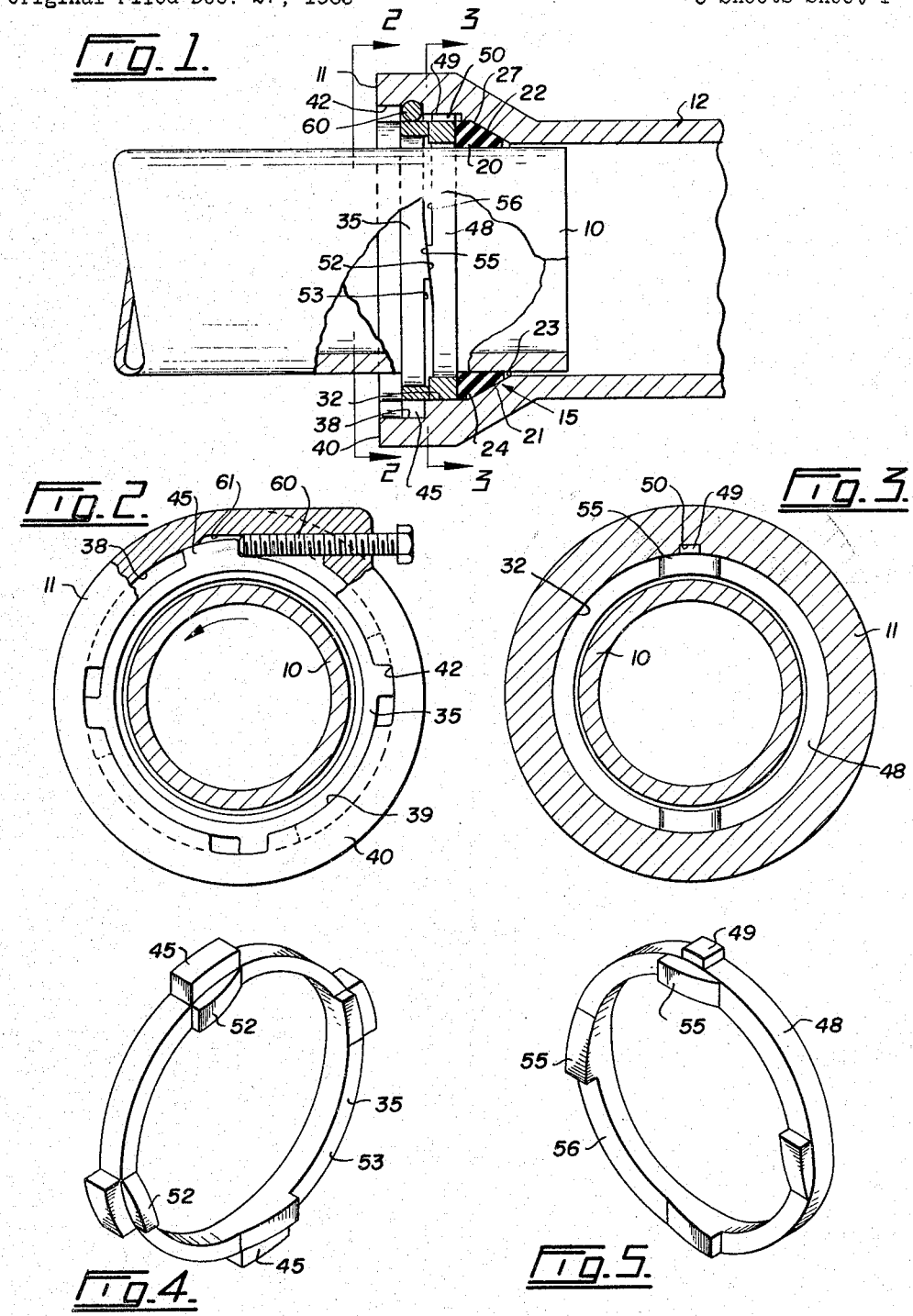

Jan. 31, 1967  V. L. BARR  3,301,567

PIPE JOINT SEALS

Original Filed Dec. 27, 1963  3 Sheets-Sheet 2

*INVENTOR*
VERNON L. BARR
BY
Featherstonhaugh & Co.
*ATTORNEYS*

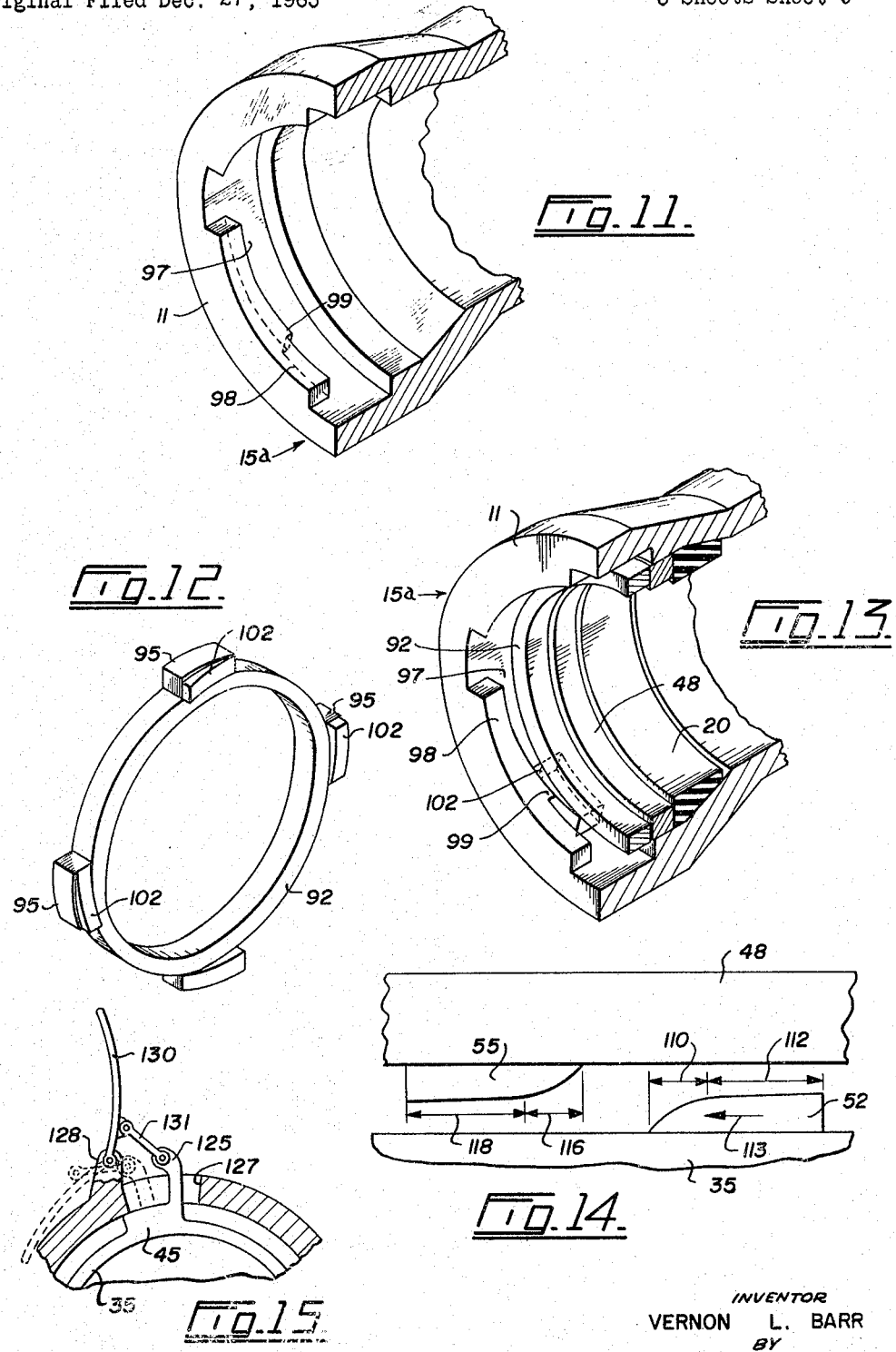

United States Patent Office 3,301,567
Patented Jan. 31, 1967

3,301,567
PIPE JOINT SEALS
Vernon L. Barr, 3382 W. 8th Ave., Vancouver,
British Columbia, Canada
Continuation of application Ser. No. 333,893, Dec. 27, 1963. This application June 28, 1966, Ser. No. 561,293
3 Claims. (Cl. 277—108)

This invention relates to seals between two pipes, between a pipe and a coupling, and between a pipe and a fitting.

Throughout the following specification, the term "pipe" is used to denote either a pipe, or a pipe coupling, or a pipe fitting.

In former pipe and fitting joints with mechanically compressed gaskets, the smaller sizes have generally had an outside screw thread and a female threaded cap, the cap being screwed down on the outside of the joint bell to compress the gasket. In the larger sizes a flanged type follower ring was pulled up by numerous bolts around its perimeter.

In the smaller sizes it was necessary to leave the threads uncoated and subject to corrosion from the surrounding conditions. Also in turning the threaded cap tight there was the likelihood of twisting or troque distortion on the seating gaskets. In the larger sizes a number of bolts were tightened up to draw a follower ring into the bell and so compress the gasket. It was necessary to tighten each bolt individually and endeavour to draw them up uniformly. In awkward positions, that is against walls, in corners, in ditches, and the like, it was difficult to get at a number of the bolts to tighten this type of joint. Further, some time was required to complete the jointing of the pipe or fitting.

Because the bolts were required to be of a reasonably high tensile strength it was difficult economically to manufacture them of material having strength and corrosion resistance that would give the bolts the corrosion life of the pipe or fitting material. Further they are under tension and due to stretching or lengthened molecular action are liable to be subject to accelerated attack by corrosion. It follows that the corrosion life of the joint was largely determined by the bolts or threaded portions of the screwed fittings.

The purpose of this invention is to provide a positive sealing band usually requiring only one bolt or stud which rotates a ring and through which a wedging action exerts pressure on a gasket, preferably through a thrust ring. The advantages of this joint are the fact that it can be formed or cast easily and economically and, since it requires fewer bolts, these can be made of highly corrosion resistant material, without affecting the cost too greatly. Further, there is no tension on any portion of the accessories, all tension being taken up in the body and the bell of the pipe or fitting which is generally heavy in cross section and of corrosion resistant material.

A further advantage is that with loose tolerance in the gasket, a spigot or an end of a pipe can be slipped into the bell of another pipe easily and quickly, and by simply tightening one nut or stud, a positive seal is assured.

This seal is located in the large or bell end of one pipe, a coupling or fitting and is adapted to receive a small end of another pipe. In other words, the seal may be between two pipes, between a pipe and a coupling, or between a pipe and a fitting.

A pipe joint seal according to the present invention comprises an annular seat in the bell end of a pipe, and an annular compressible gasket in the bell end bearing against this seat and adapted to fit around the end of another pipe. The bell end includes means for limiting radial movement of this gasket in an outer direction. An actuating ring is mounted for circumferential movement in the bell end adjacent the gasket, and tangentially arranged means is provided for circumferentially rotating this ring. The seal includes means causing axial compression of the gasket resulting from the rotation of the actuating ring to cause said gasket to move radially inwardly to grip the pipe end around which the gasket extends. The seat of the bell is preferably bevelled and the gasket is bevelled to correspond with the bevel of the seat. In most cases, the best results are attained if the bevel of the seat is steeper than the bevel of the gasket.

A feature of the present seal is that it includes cams for causing axial compression of the gasket, and these cams can be shaped so that a small amount of circumferential movement of the actuating ring results in the desired amount of gasket compression. Furthermore, the cams can be shaped so that the first axial compression of the gasket is relatively fast, and the final or tightening movement is fairly slow.

Figure 8:
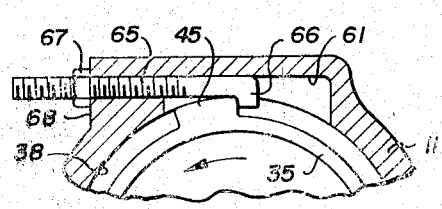
Figure 7:
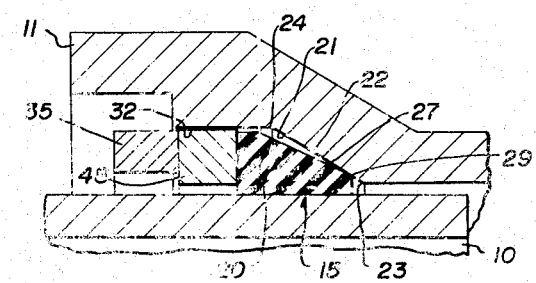
Figure 9:
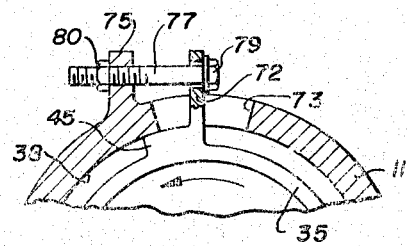
Figure 10:
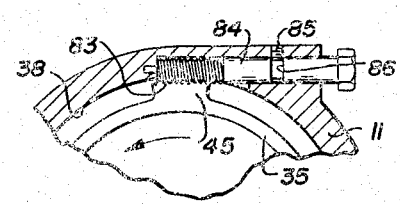

Examples of this invention are illustrated in the accompanying drawings, in which, FIGURE 1 is a longitudinal sectional view through a joint seal between adjacent ends of two pipes, FIGURE 2 is a vertical section taken on the line 2—2 of FIGURE 1, FIGURE 3 is a vertical section taken on the line 3—3 of FIGURE 1, FIGURE 4 is a perspective view of the actuating ring of FIGURE 1, FIGURE 5 is a perspective view of a thrust ring used in the joint of FIGURE 1, FIGURE 6 is a fragmentary perspective view looking into the bell end of one of the pipes, FIGURE 7 is an enlarged fragmentary section through the joint seal and similar to FIGURE 1, FIGURE 8 is a fragmentary view similar to FIGURE 2, showing an alternative tightening arrangement for the seal, FIGURE 9 is a view similar to FIGURE 8 showing yet another alternative tightening arrangement, FIGURE 10 is another view similar to FIGURE 8 illustrating a still further tightening arrangement, FIGURE 11 is a view similar to FIGURE 6 illustrating an alternative form of joint seal, FIGURE 12 is a perspective view of an actuating ring for the seal of FIGURE 11, FIGURE 13 is a fragmentary view similar to FIGURE 11, including a portion of an actuating ring therein, FIGURE 14 is an enlarged view of two cams for the seal having a preferred cam surface shape, and FIGURE 15 is a fragmentary view similar to FIGURE 8 showing still another alternative tightening arrangement.

Referring to FIGURES 1 to 7 of the drawings, 10 is the small end of one pipe adapted to fit into the large bell end 11 of another pipe or a coupling 12. A pipe joint seal 15 according to this invention is located in bell end 11 and surrounds pipe end 10.

Seal 15 includes an annular compressible gasket 20 bearing against a seat 21 in bell end 11. This gasket is adapted to fit around pipe end 10, as clearly shown in FIGURE 1.

Seal 21 is preferably bevelled as indicated at 22 from an inner edge or nose 23 outwardly in a radial direction to an outer edge 24. Gasket 20 is formed with a bevelled surface 27 which corresponds to and faces seat bevel 22. The bevel 22 of seat 21 is preferably steeper than the bevelled surface 27 of gasket 20, as clearly shown in FIGURE 7. With this arrangement, and before the gasket is compressed, the inner corner or nose 29 of the gasket bears against inclined seat 21 while the rest of bevelled surface 27 is inclined away from said seat.

Seat 21 of bell end 11 limits radial movement of gasket 20 is an outer direction, and it is preferable to provide an annular shoulder 32 within said bell end at the edge 24 of seat 21 to assist in this confining action so that when the gasket is compressed in an axial direction against seat 21, it is caused to move or flow inwardly to grip pipe end 10.

An actuating ring 35 is mounted for circumferential movement in bell end 10. This ring may be moved in an axial direction towards gasket 20 during rotation thereof, but in the illustrated seal 15, the actuating ring is constrained against axial movement.

Actuating ring 35 is mounted in an annular groove 38 formed in the inner surface of bell end 11. A shoulder 39 is formed in the bell end between this groove 38 and the outer surface 40 of the bell end. This shoulder is interrupted by a plurality of recesses 42 formed therein and communicating with groove 38, see FIGURE 6. Actuating ring 35 includes a plurality of lugs 45 radiating therefrom, said lugs being movable through recesses 42 in shoulder 39 into groove 38 when the actuating ring is inserted into bell end 11. Rotation of the ring moves lugs 45 behind shoulder 39 so that said ring can move circumferentially, but cannot move in an axial direction.

A thrust ring 48 is mounted in bell end 11 between actuating ring 48 and gasket 20. Thrust ring 35 may be free in the bell end and depending upon its frictional engagement with gasket 20 to prevent rotation thereof, but preferably said thrust ring has a lug 49 radiating therefrom which fits into a groove 50 formed in the inner surface of the bell end and extending in an axial direction, said groove opening into annular groove 38 opposite one of the recesses 42.

When ring 35 is rotated in a circumferential direction, thrust ring 48 is moved axially towards or allowed to move axially away from gasket 20, depending on the direction of rotation of the ring. In seal 15, this axial movement is accomplished by a plurality of bevelled cams 52 formed on the inner surface 53 of ring 35 and correspondingly bevelled cams 55 formed on the outer surface 56 of thrust ring 48, see FIGURES 4 and 5. When rings 35 and 48 are mounted in their proper positions within bell end 11, cams 52 of the actuating ring bear against cams 55 of the thrust ring so that rotation of the actuating ring in one direction moves the thrust ring against gasket 20 to compress the latter, while rotation of said actuating ring in the opposite direction allows the gasket to reassert itself and to press ring 48 outwardly. If desired, a lug or bearing may be substituted for each of the cams 52 or 55, in which case the axial movement of the thrust ring will be slower than when the two opposed cams are used.

Actuating ring 35 may be circumferentially rotated in a number of different ways. In FIGURES 2, a bolt 60 is threaded through a portion of bell end 11 and extends substantially tangentially towards actuating ring 35. The inner end of bolt 60 is located in a large recess 61 formed in the inner surface of the bell end and opening into groove 38 thereof, and said bolt end bears against one of the ring lugs 45. When bolt 60 is turned inwardly of the bell end, it moves against the lug 45 to rotate ring 35 in the direction which moves compression ring 38 against gasket 20 to cause said gasket to flow inwardly to grip pipe end 10. When the bolt is turned in the opposite direction, ring 35 is free to rotate in the opposite direction under the action of cams 52–55 when the gasket reasserts itself. When the cams of the actuating ring are pressing the thrust ring and, consequently, the gasket inwardly, lugs 45 of the actuating ring bear against shoulder 39 to provide the necessary axial thrust.

FIGURE 8 illustrates an alternative means of rotating actuating ring 35. In this example, a bolt 65 extends freely through bell end 11 into recess 61 and over one of the actuating ring lugs 45. The bolt is formed with a finger 66 at its inner end which engages said lug 45. A nut 67 threaded on the outer end of bolt 65 is adapted to bear against a shoulder 68 formed on the bell end so that when the nut is screwed down on the bolt, the latter moves lug 45 to cause the actuating ring to compress the gasket. When the nut is turned in the opposite direction, the actuating ring is free to rotate in the opposite direction and thereby free the gasket.

FIGURE 9 illustrates yet another alternative way of rotating actuating ring 35. In this example, one of the actuating ring lugs 45 has an extension 72 radiating outwardly through a slot 73 formed in the bell end and extending substantially parallel with a lug 75 formed on and projecting outwardly from the outer surface of said bell end. A bolt 77 extends through lug extension 72 and lug 75, and has a head 79 on one end and a nut 80 threaded on the opposite end. When the nut is tightened on the bolt, ring 35 is rotated to compress gasket 20, and when said nut is rotated in the opposite direction, the actuating ring is free to rotate in the opposite direction.

FIGURE 10 illustrates still another way of rotating actuating ring 35. In this example, one of the lugs 45 of actuating ring 35 has threads 83 formed on its outer end which mesh with the threaded inner end of a bolt 84 which extends tangentially outwardly of bell end 11. Bolt 84 is free to rotate in the bell end but is constrained against longitudinal movement in any suitable manner, such as by means of a set screw 85 threaded into the bell end and extending into a groove 86 formed in the bolt. When bolt 84 is turned in one direction, actuating ring 35 is rotated to compress gasket 20, and when the bolt is rotated in the opposite direction, the actuating ring is turned in the opposite direction leaving the gasket free to expand.

The operation of seal 15 is apparent from the above. When actuating ring 35 is rotated in one direction, thrust ring 48 is moved against gasket 20 which, because of its seating on bevel seat 21, is urged inwardly firmly to grip the pipe end 10. When gasket 20 is pressed inwardly, because of the fact that the bevel of seat 21 is steeper than the bevel of the outer surface of gasket 20, a high point of compression is created at the nose or corner 29 of the gasket against the seat, and this dissipates the thrust action through expanding the thicker rear section of the gasket. This helps to keep the material of the gasket alive for a longer period than would otherwise be the case. The result is that there is a locking effect on the nose of the gasket and a resistance to distortion at this point because the compression is high enough to overcome the dissipated thrust acting through the thicker section of the gasket. As a result of this, there is a definite retarding of "cold flow" taking place between the inner surface of the bell and the outer surface of pipe 10 at the nose or inner edge of the gasket. This overcomes a fault long inherent in this type of sealing gland. In addition to this, this feature provides a positive mechanical seal for pipes of different outside diameters in the same relative nominal size range by simply changing the thrust ring and gasket thickness.

FIGURES 11 to 13 illustrate an alternative form of seal 15a. In this modification, an actuating ring 92 is provided in the bell end 11 and is adapted to move in an axial direction. This ring has a plurality of cam lugs radiating therefrom and adapted to extend into a groove 97 formed in the bell end which is the same as but wider than groove 38 described above. Shoulders 98 are provided in the bell end between groove 78 and the outer surface of said bell end, each shoulder having a cam surface 99 along the inner edge thereof facing groove 97. These cam surfaces form cams or thread means for moving actuating ring 92 in an axial direction when said ring is moved circumferentially. Each cam lug 95 of the ring is formed with an outer cam surface 102 which corresponds to a cam surface 99 of one of the shoulders 98. If desired, actuating ring 92 may bear directly against gasket 20, but it is preferable to interpose a thrust ring 48 therebetween. Furthermore, a lug or bearing may be substituted for each of the cam surfaces 99 or 102, in which case the axial movement of the actuating ring will be slower than when the two opposed cam surfaces are used.

Actuating ring 92 is rotated circumferentially by any of the rotating means illustrated in FIGURES 2, 8, 9 and 10, the bolt that does the rotating being associated with one of the cam lugs 95 of this actuating ring.

Seal 15a of FIGURES 11 to 13 operates in substantially the same manner as seal 15. The only difference is that when actuating ring 92 is rotated circumferentially, it is moved axially to effect the compression of gasket 20 or to release said gasket, depending upon the direction of rotation of the actuating ring.

One of the advantages of seal 15a is that the cam shoulders 98 may be formed in any desired manner. For example, they may be formed when the bell end of the pipe is cast, they may be separate pieces of metal welded or otherwise secured in place in the bell end, or the bell end may be formed of metal which may be indented or bent to form said cam shoulders.

FIGURE 14 illustrates desired shapes for cams 52 and 55, and cams or cam surfaces 99 and 102, one of each of the cams 52 and 55 of actuating ring 35 and thrust ring 48 being used for this purpose. Cam 52 has a first cam surface 110 which is sharply curved or angled outwardly from the ring, and a second cam surface 112 slightly curved or angled in an outward direction, said surface 112 following surface 110 with reference to the direction of movement of the cam, indicated by arrow 113, when ring 35 is being rotated to compress the seal gasket. Cam 55 has a first sharply curved or angled surface 116 and a second slightly curved or angled surface 118, said first and second surfaces being reversed with respect to first and second surfaces 110 and 112 of cam 52.

When ring 35 is first rotated in the direction of arrow 113, surfaces 110 and 116 of cams 52 and 55 engage and, owing to the sharp curves thereof, rapidly shift ring 48 in an axial direction to compress the seal gasket. During the remainder of the rotation, slightly curved surfaces 112 and 118 engage to apply pressure more slowly to the gasket. Thus, the slack is rapidly taken up and then greater leverage is applied to the gasket for the final tightening. This results in less rotational movement being required in the actuating ring to effect a tight seal around the pipe being gripped by the gasket than would be required with ordinary cams in which the curve or angle of the surface thereof is constant throughout its length. This means that the actuating bolts, such as bolt 60, do not have to be very long in order to provide the necessary axial movement for proper sealing. Also, surfaces 112 and 118 provide a large surface engagement for retaining the seal tight once it has been applied.

FIGURE 15 illustrates an alternative quick-acting means for rotating actuating ring 35 and which is equally applicable to actuating ring 92. One of the actuating ring lugs 45 has an extension or lug 125 radiating outwardly through a slot 127 formed in bell end 11 and extending parallel with a lug 128 formed on and projecting outwardly from the outer surface of said bell end. A toggle lever 130 is pivotally mounted at one end on lug 128, and a toggle line 131 is pivotally connected at its opposite ends to lever 130 and lug extension 125.

When lever 130 is in the raised position, shown in FIGURE 15, ring 35 is in the position where gasket 20 is released, but when this lever is swung downwardly, link 131 is shifted to the opposite side of the plane passing through the pivotal mounting of the lever on lug 128 and the pivotal connection of the link to extension 125. This action rotates actuating ring 35 to compress gasket 20 and locks the ring in this position, at which time the lever lies over the outer surface of bell end 11. When lever 130 is raised, ring 35 is rotated to release the gasket.

I claim:

1. A pipe joint seal for a first pipe having a large bell end and a second pipe having an end adapted to extend into said bell end, said bell end having an entrance opening outwardly therefrom, comprisig an annular seat in the bell end, said seat being bevelled from an inner edge outwardly towards the bell end entrance to an outer edge, an annular compressible gasket in the bell end having a bevelled surface adapted to bear against the bevelled seat, said gasket when free being adapted to fit loosely around said second pipe end, an annular cylindrical grooved surface in the bell end between the said entrance opening and the bevelled seat, an actuating ring mounted in the groove for rotational movement about its axis but constrained against axial movement in the said groove, a thrust ring element mounted between the actuating ring and the gasket and bearing against an outer edge of said gasket for axial movement and including a restraining means to restrain the thrust ring against rotational movement, spaced lugs extending radially from the actuating ring adapted to fit into the said cylindrical groove, means for applying a constant force to the said actuating ring in a direction substantially perpendicular to the central axis of the ring and in a plane containing the ring to rotate the said ring circumferentially, a plurality of bevelled cams mounted on the actuating ring and extending axially from the said actuating ring toward the said thrust ring, a plurality of cams on the thrust ring in opposing relationship to and operative against the cams on the actuating ring, whereby when the said force is applied to the actuating ring to rotate the same then the second set of cams and the thrust ring moves axially towards the gasket to compress the gasket axially against the said inner edge of the seat, and wherein the expanding force of the gasket towards the open end of the bell acting upon the thrust ring is transferred to the actuating ring only in a direction substantially parallel to the said axis thereof while substantially all of the transverse component of said force is absorbed by the said restraining means.

2. A pipe joint seal as claimed in claim 1 in which the gasket is formed with a nose at an inner edge thereof, and the bevel of the seat forms a greater angle with the axis of the pipe than does the bevel of the gasket, whereby only said nose of the gasket bears against the seat when the gasket is uncompressed, and when the ring is rotated to compress the gasket a high point of compresion is created at said nose against the seat and the outer edge of the gasket expands outwardly against the seat and inwardly against the second pipe to dissipate the axial force on the gasket through the said expanding gasket outer edge.

3. A pipe joint seal as claimed in claim 1 in which each cam of each set has a first surface angled sharply outwardly away from the actuating ring followed by a second surface angled slightly outwardly away from said actuating ring, said first surface of each cam in the first set being the first to meet a surface of an opposing cam in the second set when the said sets of cams are moved circumferentially towards each other.

References Cited by the Examiner
UNITED STATES PATENTS

| 991,891 | 5/1911 | Robinson | 285—432 |
|---|---|---|---|
| 1,911,659 | 5/1933 | Weaver | 285—360 |
| 2,283,975 | 5/1942 | Dillon. | |
| 2,455,658 | 12/1948 | Dons | 285—348 |
| 2,795,985 | 6/1957 | Wilson | 285—374 |
| 3,144,262 | 8/1964 | Reynolds | 285—311 |

(Other references on following page)

FOREIGN PATENTS

| | | |
|---|---|---|
| 547,116 | 10/1957 | Canada. |
| 828,334 | 1/1952 | Germany. |
| 382,966 | 11/1932 | Great Britain. |
| 416,809 | 9/1934 | Great Britain. |
| 458,732 | 12/1936 | Great Britain. |
| 490,548 | 8/1938 | Great Britain. |
| 54,515 | 5/1943 | Netherlands. |

CARL W. TOMLIN, *Primary Examiner.*

THOMAS F. CALLAGHAN, *Examiner.*